(12) United States Patent
Yu et al.

(10) Patent No.: US 11,834,014 B2
(45) Date of Patent: Dec. 5, 2023

(54) SMART GLADHAND WITH WIRELESS ACTUATION AND REPORTING

(71) Applicant: PHILLIPS CONNECT TECHNOLOGIES LLC, Santa Fe Springs, CA (US)

(72) Inventors: Man Chiu Yu, Santa Fe Springs, CA (US); Thomas Peterson, Glendora, CA (US); G. Y. Hanna, Santa Fe Springs, CA (US)

(73) Assignee: Phillips Connect Technologies, LLC, Santa Fe Springs, CA (US)

(*) Notice: Subject to any disclaimer, the term of this patent is extended or adjusted under 35 U.S.C. 154(b) by 259 days.

(21) Appl. No.: 17/326,225

(22) Filed: May 20, 2021

(65) Prior Publication Data

US 2022/0371570 A1  Nov. 24, 2022

(51) Int. Cl.
*B60T 17/22* (2006.01)
*H01Q 1/32* (2006.01)
*B60T 17/04* (2006.01)

(52) U.S. Cl.
CPC ............ *B60T 17/22* (2013.01); *B60T 17/043* (2013.01); *H01Q 1/3291* (2013.01)

(58) Field of Classification Search
CPC .............................. B60T 17/046; B60T 17/043
See application file for complete search history.

(56) References Cited

U.S. PATENT DOCUMENTS

| | | |
|---|---|---|
| 4,852,915 A | 8/1989 | Campanini |
| 5,410,894 A | 5/1995 | Fox et al. |
| 5,842,724 A * | 12/1998 | Kozinski ............... F16L 37/256 285/65 |
| 5,911,444 A * | 6/1999 | Buchter ................. B60T 17/043 285/83 |
| 6,402,261 B1 | 6/2002 | Barnett |
| 7,401,801 B2 | 7/2008 | Halverson et al. |
| 8,398,120 B2 | 3/2013 | Puluc et al. |
| 9,716,968 B2 | 7/2017 | Mansuri et al. |
| 2006/0043731 A1* | 3/2006 | Sommerfeld ......... F16L 37/256 285/65 |
| 2018/0099712 A1 | 4/2018 | Bean et al. |

(Continued)

FOREIGN PATENT DOCUMENTS

| | | | |
|---|---|---|---|
| CN | 1922431 A * | 2/2007 | ............ B60T 17/043 |
| EP | 0278228 | 4/1993 | |
| EP | 2949490 | 11/2018 | |

OTHER PUBLICATIONS

Transport Security, Inc., A: Trailer Air Brake Lock/Glad Hand Lock for Trailers and Containers, Oct. 19, 2010.

(Continued)

*Primary Examiner* — Melanie Torres Williams
(74) *Attorney, Agent, or Firm* — Haynes and Boone, LLP (57) ABSTRACT

A gladhand assembly includes a gladhand that rotates about a first axis with respect to a sealed housing. The sealed housing includes a lever affixed to the first axis to rotate as the gladhand rotates. A stop within the sealed housing may be configured into an engaged position in which it engages with the lever to lock the gladhand into a fixed position in which the gladhand cannot be rotated about the first axis. In addition, the stop may be configured into a retracted position to permit the lever to rotate and allow the gladhand to be rotated into a deployed position.

20 Claims, 5 Drawing Sheets

(56) References Cited

U.S. PATENT DOCUMENTS

2019/0232738 A1  8/2019  Furuno et al.
2019/0302764 A1  10/2019  Smith et al.

OTHER PUBLICATIONS

SGI, Canada, B: Glad Hands, May 12, 2016 SGI.
Devere Enterprises, C: D-Lock: Original Glad Hand Lock, Aug. 24, 2016.
Devere Enterprises, D: Double Lock D-Lock: Glad Hand Lock, Sep. 6, 2017.
Subarashi Models, F: Smart Coupler Specifications, Feb. 4, 2019.

* cited by examiner

SMART GLADHAND WITH WIRELESS ACTUATION AND REPORTING

TECHNICAL FIELD

The present invention relates to the field of pneumatic systems and more particularly to a locking mechanism used in a pneumatic system.

BACKGROUND

The design of the tractor in a tractor-trailer varies depending upon the region but regardless of the design, it is conventional to use a pneumatic connection between the tractor and the towed asset (referred to as a trailer in the following discussion) to ease the connection and disconnection of the trailer. The trailer has an emergency braking system such as through spring brakes that are normally on and must be actuated off by air pressure to allow the trailer to move. In addition, the service brakes are also air actuated. A tractor thus requires two connectors or couplings to the trailer, one for the emergency brakes and one for the service brakes.

A virtually universally-adopted design for the two pneumatic connections is commonly denoted as a gladhand connector. The trailer and the tractor each have opposing gladhand connectors that when coupled together resemble a pair of shaking hands, hence the gladhand name. A trailer will thus have two gladhand couplers for the two separate braking systems. Although fixed gladhands are available, it is conventional to install swinging gladhands that rotate back to lie flush against the trailer when not in use. As compared to a fixed or non-rotating gladhand, a swinging gladhand is not as prone to damage. In addition, a swinging gladhand seals off its air conduit when the swinging gladhand is in its folded, non-coupled state in which it lies flush against the trailer. In this fashion, insects and debris do not enter the air conduit while the gladhand is disconnected.

A swinging gladhand includes a spring that rotates and biases the gladhand to lie flush against the trailer in its folded state. To connect to the tractor, a driver will then rotate the gladhand against the spring pressure to place the gladhand into its deployed configuration so that the opposing gladhand from the tractor may be connected to the trailer's gladhand. The connection between the two gladhands then prevents the spring pressure from returning the swinging gladhand to its folded configuration until the swinging gladhand is disconnected. Once disconnected, the spring pressure returns the swinging gladhand to it folded configuration so that the swinging gladhand is protected from damage and to keep the air conduit leading from the swinging gladhand to the trailer's braking system uncontaminated from insects and debris.

SUMMARY

A gladhand assembly is disclosed that includes: a sealed housing; a gladhand rotatably attached to the sealed housing through a first axis; a lever within the sealed housing and attached to the gladhand through the first axis; a stop within the sealed housing; and an actuator contained within the sealed housing, the actuator being configurable into an extended position in which the stop is engaged with the lever to prevent the gladhand from rotating about the first axis and into a retracted position in which the stop is retracted from the lever to permit the gladhand to rotate about the first axis.

In addition, a method of controlling a gladhand assembly is provided that includes: within a sealed housing, actuating a stop into an engaged position with a lever, the lever being connected with a first axis of a gladhand to maintain the gladhand in a fixed position; and actuating the stop into a retracted position from the lever to permit the gladhand to be rotated about the first axis into a deployed configuration.

Finally, a gladhand assembly is provided that includes: a sealed housing including a planar surface; a gladhand rotatably mounted to the sealed housing through a first axis; a lever attached to the first axis and configured to rotate with the gladhand about the first axis and across the planar surface within the sealed housing; a stop contained within the sealed housing, the stop being configurable into an extended position in which the stop extends above the planar surface to engage with the lever and prevent the lever from a rotation about the first axis and into a retracted position in which the stop is retracted below the planar surface to permit the gladhand to rotate about the first axis.

These and additional advantageous features of the disclosed embodiments may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An improved swinging gladhand assembly is provided that may be wirelessly controlled and monitored. Through the wireless control, an operator may lock the swinging gladhand into its folded configuration. As noted earlier, a swinging gladhand includes a spring that biases the swinging gladhand to lie flat against the trailer in the folded configuration. A trucker will then rotate the swinging gladhand away from the trailer to point towards the tractor so that the swinging gladhand may be connected or coupled to the tractor's gladhand. The locking of the swinging gladhand into its folded configuration is quite advantageous with regard to ensuring that that proper towable asset is connected to the tractor. In that regard, it is not unusual that a warehouse or other facility will have assorted towable assets at its docks. A trucker may then readily connect to the wrong towable asset (e.g. a trailer, a flatbed, and so on). But the wireless control of the gladhand assembly prevents the driver from making such a mistake because the swinging gladhand will only deploy (rotate away from the towable asset) when allowed by the wireless control. In this fashion, an operator may readily actuate the appropriate trailer's swinging gladhands to be deployable and prevent the trucker from hauling the wrong towable asset. In a default state as will be explained further herein, the gladhand assembly includes a stop that prevents the swinging gladhand from being deployed until a user commands an actuator through the wireless control to release the stop so that the swinging gladhand may be rotated out into its deployed configuration.

For brevity, a swinging gladhand will be simply referred to as a gladhand in the following discussion. In addition, the following discussion will assume that the term "gladhand" without further clarification is referring to the towable asset's gladhand. Not only does the improved gladhand assembly have wireless control of the actuator but it is also configured to wirelessly report whether the gladhand is in the folded or deployed configuration. Since the gladhand will return to its default position once it is disconnected from the tractor's gladhand unless the trucker continues to maintain the gladhand in its deployed position, an operator may assume with near certainty that if a gladhand assembly is reporting that it is in the deployed configuration, the corresponding towable asset is connected to a tractor. Conversely, if a gladhand assembly is reporting that it is in the folded configuration, the operator may again assume with near certainty that the corresponding towable asset is disconnected from the tractor. In this fashion, an operator may monitor the usage of its towable assets without relying on the truckers to report the towable asset usage.

With respect to a housing of the gladhand assembly, the gladhand rotates on an axis or pivot when deployed from the folded configuration to the deployed configuration. This axis extends from the gladhand to the housing of the gladhand assembly. The housing is secured to the towable asset such as through bolts or other suitable fasteners. A lever is integrated with the gladhand to also rotate on the axis. Due to this integration, the lever rotates when the gladhand rotates. If the gladhand is the folded configuration, the lever is thus also in a similar folded position. Conversely, if the gladhand is rotated into the deployed configuration, the lever also rotates into the deployed position. Given this integration, the lever position is a proxy for the gladhand position. In contrast to the gladhand, however, a sealed portion of the housing contains the lever. The lever rotates as the gladhand rotates to rotate the lever in a horizontal plane such as defined by a planar surface within the sealed portion of the housing. With the gladhand in the folded position, the lever will be in a corresponding default or starting position in the horizontal plane.

The actuator and stop are also located within the sealed portion of the housing. The housing includes a piston or rod to engage with the stop. In an extended configuration of the actuator, the piston is extended and forces the stop to project above the planar surface across which the lever rotates. This projection of the stop above the planar surface prevents the lever from being rotated from its folded position in the deployed position. Since the lever and gladhand are connected to rotate together, the gladhand is also prevented from being deployed from its folded configuration when the actuator is in its extended configuration. The actuator also has a retracted configuration in which its piston retracts so that the stop no longer projects sufficiently above the planar surface to prevent the gladhand and lever from rotating about the axis. The gladhand (and the lever) may thus be rotated into the deployed configuration when the actuator is in the retracted configuration.

Note how advantageous the actuator/lever control of the gladhand is in that the actuator and lever are within the sealed portion of the housing, which protects the actuator and lever against the elements. In contrast, the gladhand is subjected to the elements but the actuator and lever are protected by the sealed portion of the housing, which increases the robustness and reliability of the gladhand control. The sealed portion also includes a controller for controlling the actuator with respect to commands received through a wireless transceiver (e.g., Bluetooth, cellular, WiFi, or any suitable wireless protocol). The wireless transceiver may receive orders from an operator as to whether the actuator should be placed in its deployed or retracted state to prevent or permit deployment of the gladhand, respectively. The wireless transceiver may also report the deployed or folded configuration of the gladhand to the operator.

In one implementation, a driver may have a mobile device such as a smartphone including a mobile application (app) configured to wirelessly command the wireless transceiver for unlocking and/or locking of the gladhand. A fleet operator may then transmit an identity of the corresponding towable asset to the driver through the mobile application. The driver may then command the gladhand to unlock through the mobile application. This is quite advantageous with regard to preventing the driver from towing the incorrect towable asset as only the gladhand on the proper towable asset will rotate into the deployed state. In some implementations, the wireless transceiver in the gladhand assembly will require authentication such as requiring receipt of an encrypted key prior to unlocking the gladhand so as to prevent an unlocking of the gladhand by an unauthorized driver.

The sealed portion of the housing protects one or more sensors. For example, the housing may include a first switch that detects whether the lever is in the folded configuration to in turn detect whether the gladhand is folded or deployed. In addition, the housing may include a second switch that monitors whether the actuator is in the extended or retracted position. This is advantageous as will be explained further herein with regard to controlling the actuator and detecting any faults in its operation. The controller monitors the switch positions so that the gladhand state (deployed or folded) as well as the actuator state and any associated faults may be reported to an operator through the wireless transceiver.

Figure 1:
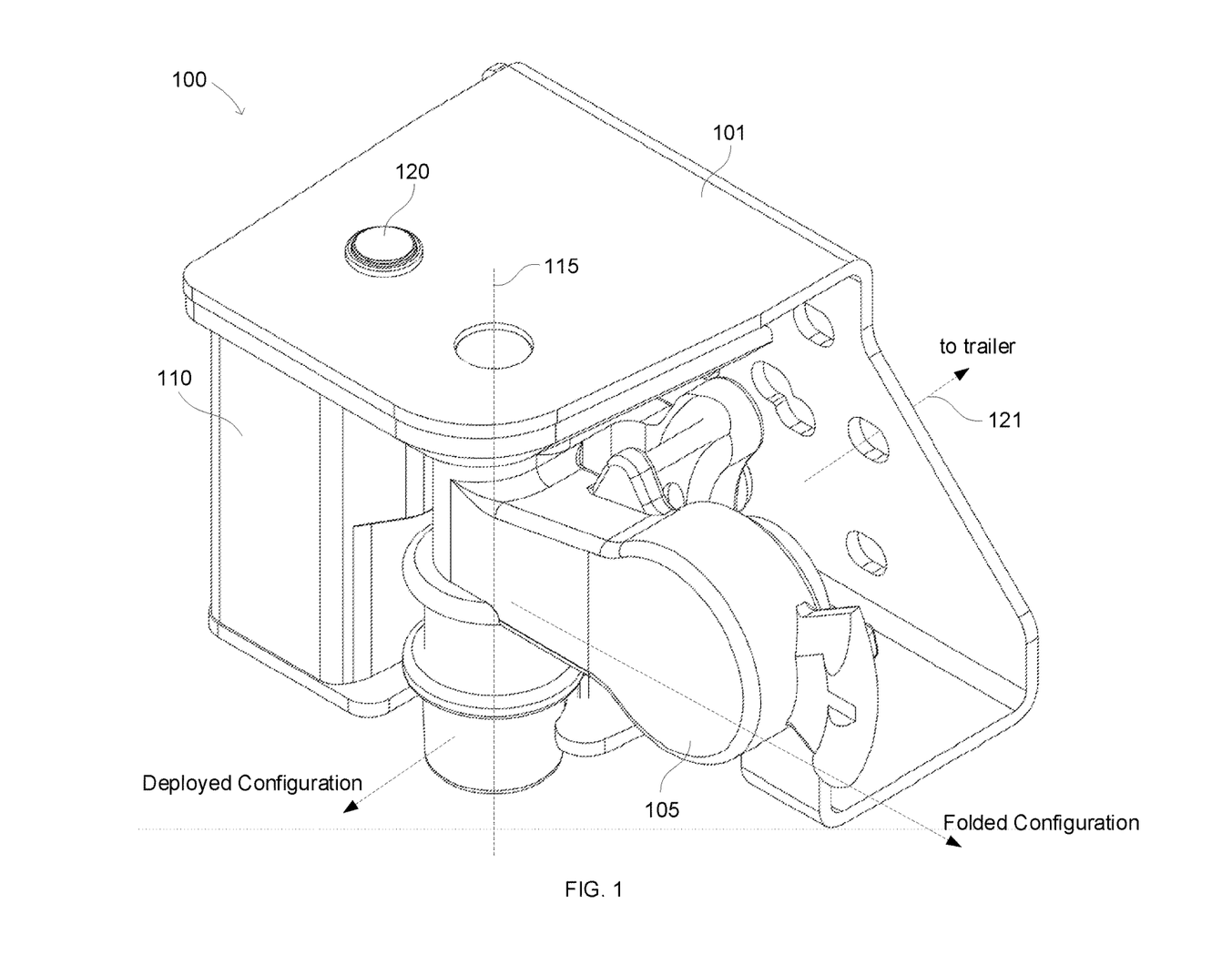
FIG. 1 is a perspective view of a gladhand assembly in accordance with an aspect of the disclosure.

An example gladhand assembly embodiment will now be discussed in more detail. Turning now to the drawings, a gladhand assembly 100 is shown in FIG. 1 in a perspective view from the direction of a driver or the tractor (not illustrated). A swinging gladhand 105 is conventional and thus will not be discussed further. Gladhand 105 rotates on an axis 115 between a folded configuration shown in FIG. 1 to a deployed configuration. The axis 115 is received by a housing 101 that includes a sealed portion 110. Housing 101 mounts to a towable asset (not illustrated) through various fasteners as indicated by arrow 121. Sealed portion 110 includes the lever, stop, actuator, and electronics as will be explained further herein. This is advantageous in protecting these elements as gladhand 105 is fully exposed to the weather.

Figure 2:
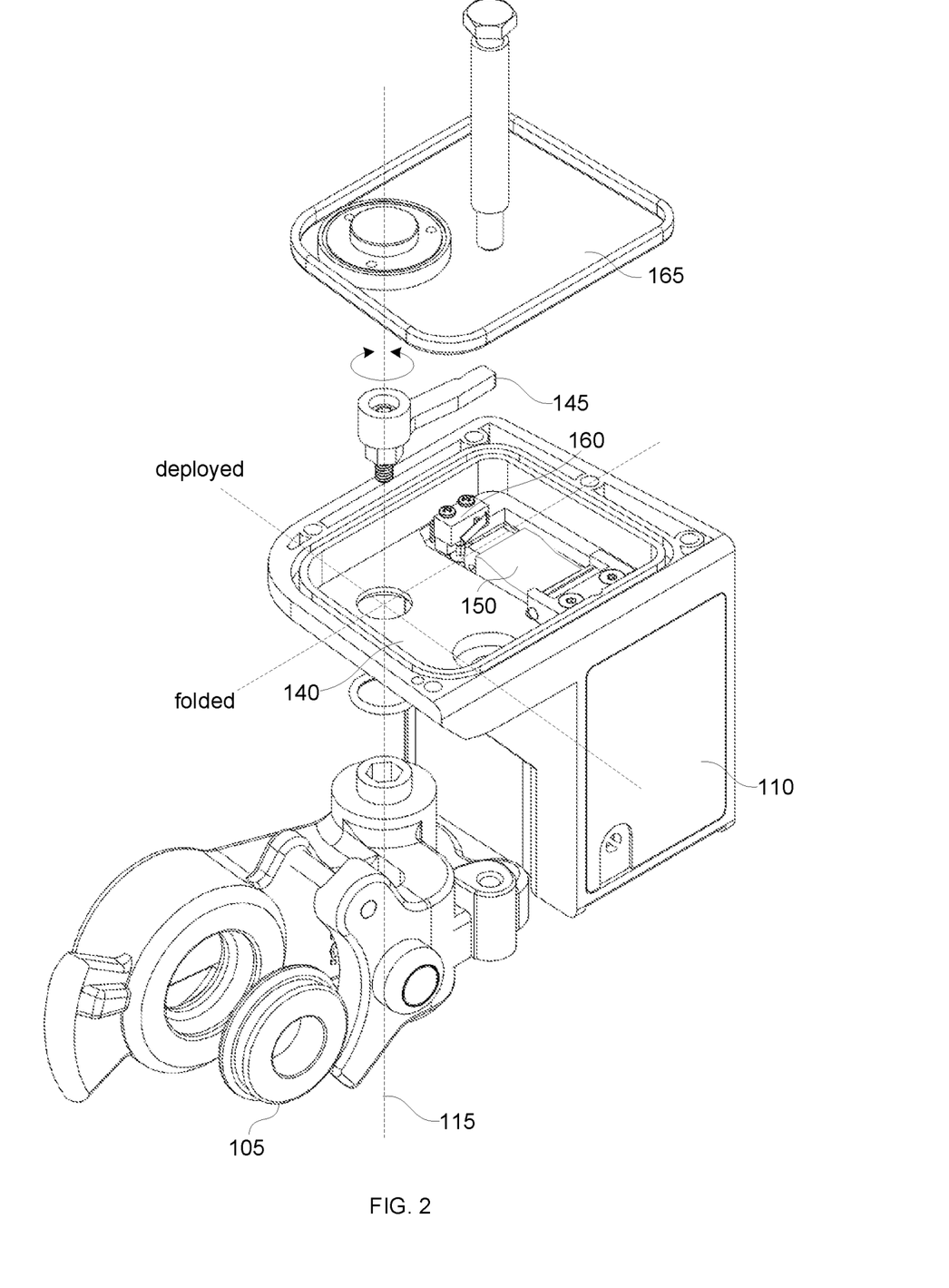
FIG. 2 is an exploded view of the sealed housing portion of the gladhand assembly in accordance with an aspect of the disclosure.

Sealed portion 110 is shown in more detail in FIG. 2, which is a perspective view from the direction of the towable (not illustrated). Gladhand 105 attaches to a lever 145 in an upper portion of sealed portion 110. This upper portion includes a planar surface 140 that defines a horizontal plane over which lever 145 rotates on axis 115. A cover 165 seals the top of sealed housing portion 110. In the folded configuration, lever 145 may abut against a stop 150. In FIG. 2, the actuator (not illustrated) is in the extended position so that stop 150 projects in an engaged configuration above planar surface 140 so as to prevent lever 145 from rotating from the folded configuration. Since gladhand 105 is secured or fastened to lever 145, the engagement of stop 150 with lever 145 also prevents gladhand 105 from being rotated about axis 115 from the folded configuration to the deployed configuration. Sealed portion 110 also includes a sensor 160 configured to sense whether lever 145 is in the folded configuration so that a controller may monitor and report the folded/deployed configuration to an operator through a wireless transceiver as will be explained further herein. Lever 145 has a flattened face that engages with a similar flattened face of stop 150 when stop 150 is in the engaged configuration as shown in FIG. 2. Referring again to FIG. 1, housing 101 incudes a removable cap 120 that when removed exposes stop 150. Should the stop be stuck in an extended configuration preventing the rotation of gladhand 105, a user may remove cap 120 and force the exposed stop 150 back into its retracted configuration.

Figure 3:
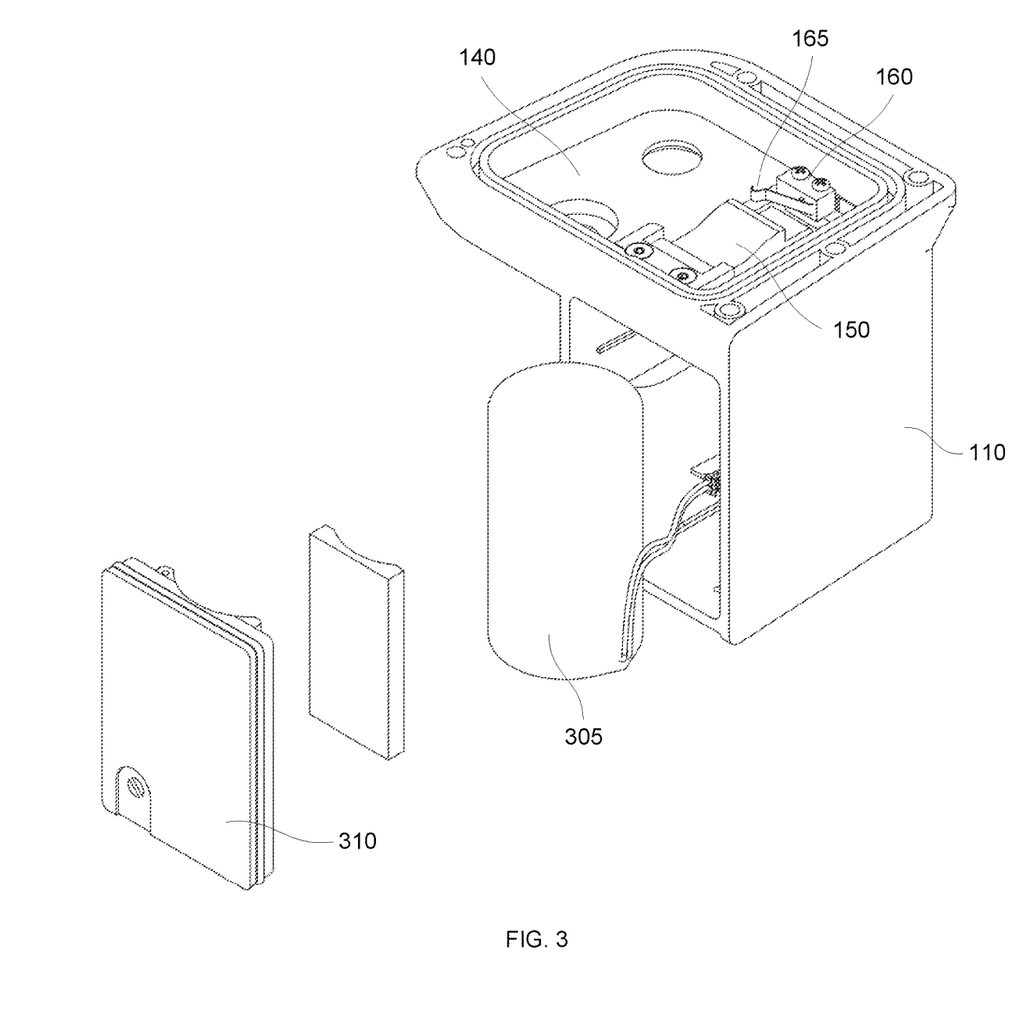
FIG. 3 is another exploded view of the sealed housing portion of the gladhand assembly in accordance with an aspect of the disclosure.

Another perspective view of sealed portion 110 is shown in FIG. 3. Switch (which may also be denoted as a sensor) 160 includes a contact 165 that forms an electrical connection in switch 160 when contact 165 is biased towards switch 160 by the positioning of lever 145 (FIG. 2) against contact 165. Sealed housing portion 110 includes a removable side cover 310 so that a battery 305 may be serviced. For example, battery 305 may be a lithium cell that may provide sufficient power for the operation of gladhand assembly 100 for approximately 10 years. FIG. 3 also provides a view of the sloping upper surface of stop 150. With stop 150 in the extended configuration (projecting above horizontal surface 140), the sloping upper surface of stop 150 slopes upwardly from a distal end to a proximal end at the flattened face of stop 150. In the retracted position or configuration, the flattened face of stop 150 that engages lever 145 in the folded configuration is pulled below horizontal plane 140 so that it no longer engages lever 145. Lever 145 may then be rotated to the deployed configuration. Should the actuator (not shown in FIG. 3 but illustrated further herein) through an error or unintended actuation then move stop 150 into the engaged configuration or position, a user may still rotate gladhand 105 back into the folded configuration because lever 145 will engage with the sloping upper surface of stop 150 to push stop 150 back into the retracted position.

Figure 4:
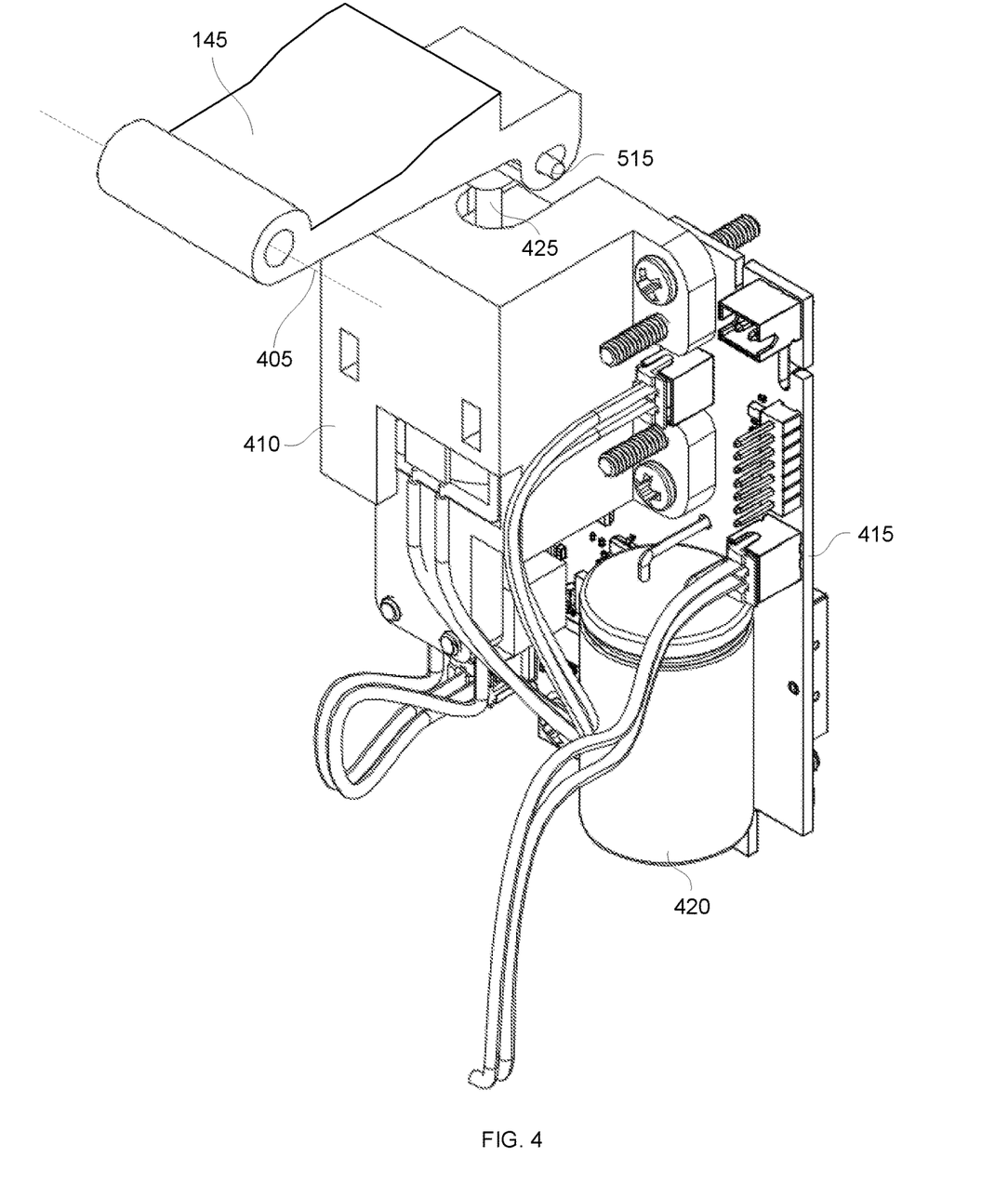
FIG. 4 illustrates a bracket holding the actuator and stop and an associated circuit board in accordance with an aspect of the disclosure.
Figure 5:
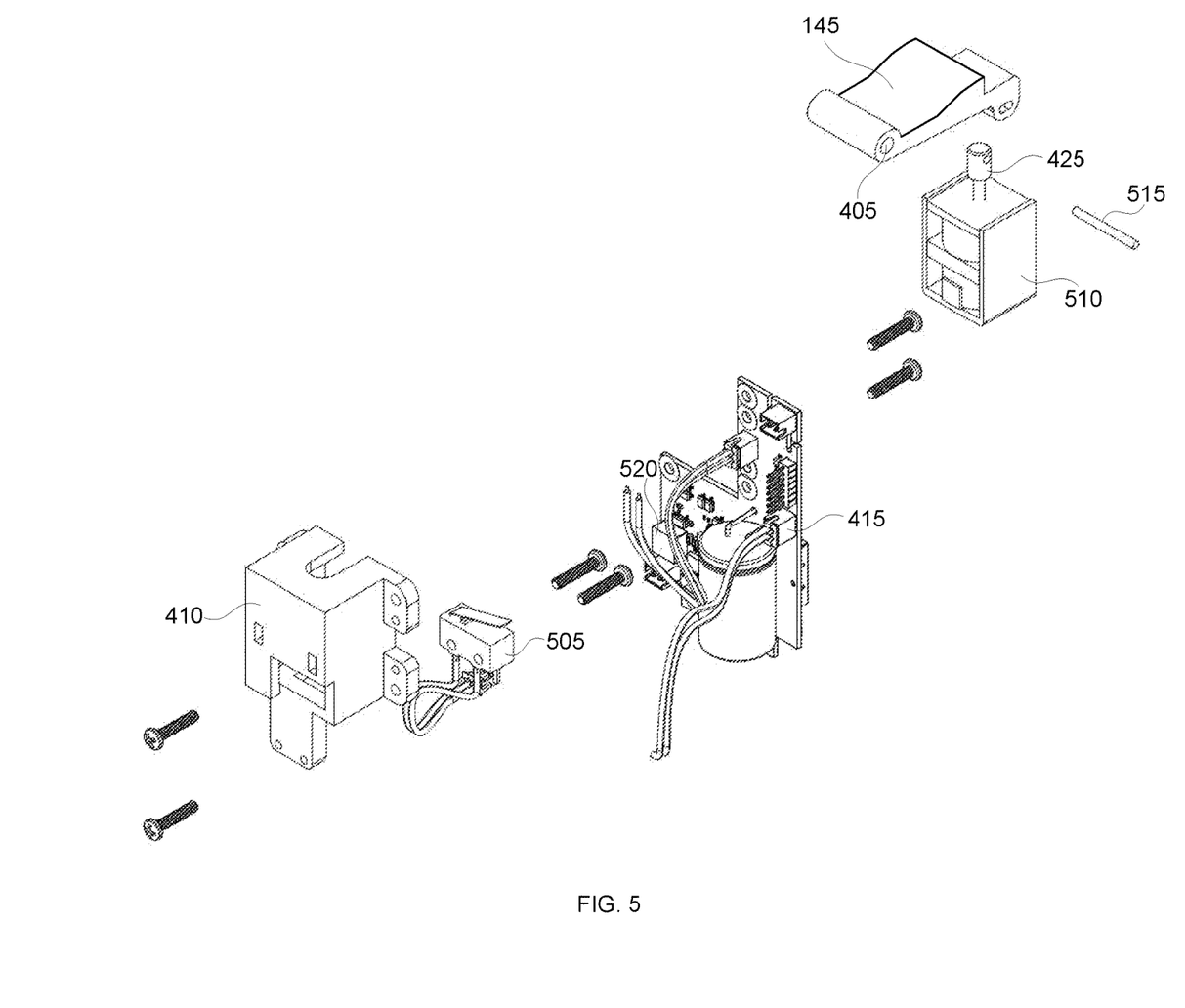
FIG. 5 is an exploded view of the bracket, actuator, and circuit board in accordance with an aspect of the disclosure.

Within sealed portion 110 as shown in FIG. 4, stop 145 may pivot on an axis 405 with respect to a bracket 410 mounted onto a circuit board 415. Circuit board 415 contains the controller and the wireless transceiver. To assist the current flow for an actuation of the actuator, circuit board 415 may include a super capacitor 420. Circuit board 415 and bracket 410 are also shown in an exploded view in FIG. 5. An actuator 510 mounts to bracket 410 and includes a piston 425 that extends and retracts to force stop 145 to rotate about axis 405 between the retracted and engaged configurations. Piston 425 may be fastened to an underside of stop 145 such as through a pin 515. Bracket 410 may also hold a switch 505 that detects whether actuator 510 has placed its piston 425 into the extended or retracted position. This is quite useful with regard to the control of actuator 510 by a controller 520 mounted onto circuit board 415 such as when actuator 510 is a solenoid. For example, controller 520 may monitor the amount of current required to extend or retract piston 425 during the operation of the solenoid. Should excessive current be necessary for this control, controller 520 may report this error to an operator. In one embodiment, controller 520 may be integrated with a wireless transceiver. Alternatively, the wireless transceiver may be separately integrated onto circuit board 415. The wireless transceiver receives the command to either retract or extend piston 425 to place stop into the engaged or retracted configuration so that the gladhand 105 may either be locked in the folded configuration or be released for positioning into the deployed configuration.

Since the gladhand assembly 100 is powered by battery 305, it is advantageous in some embodiments for the wireless transceiver to be a Bluetooth transceiver. The towable asset may then contain a hub such as contained within a nose box to communicate with the Bluetooth transceiver within the gladhand assembly 100. Since the nose box receives the 7-way connector from the tractor, the hub is powered and thus may include a cellular transceiver for communicating with the operator. The operator would thus transmit the command for releasing or locking the gladhand assembly to the cellular transceiver in the hub. A Bluetooth transceiver in the hub may then relay the command to the Bluetooth transceiver in the gladhand assembly. Similarly, the reporting of the switch positions and any associated error conditions by the gladhand assembly controller may be relayed through the Bluetooth connection to the hub and from there through the hub's cellular connection to the operator.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A gladhand assembly, comprising:
a housing including a sealed portion;
a gladhand rotatably attached to the housing through a first axis;
a lever contained within the sealed portion and attached to the gladhand through the first axis;
a stop within the sealed portion; and
an actuator within the sealed portion and coupled to the stop, the actuator being configurable into an extended position in which the stop is engaged with the lever to prevent the gladhand from rotating about the first axis and configurable into a retracted position in which the stop is retracted from the lever to permit the gladhand to rotate about the first axis.

2. The gladhand assembly of claim 1, wherein the actuator comprises a solenoid.

3. The gladhand assembly of claim 1, further comprising:
a controller within the sealed portion, the controller being configured to control a configuration of the actuator into the extended position and into the retracted position.

4. The gladhand assembly of claim 3, further comprising:
a wireless transceiver within the sealed portion, the wireless transceiver being configured to receive a command to control the configuration of the actuator.

5. The gladhand assembly of claim 4, further comprising a sensor within the sealed portion, the sensor being configured to detect whether the lever is in a retracted position to be engaged with the stop, and wherein the controller is further configured to report through the wireless transceiver whether the sensor has detected that the lever is in the retracted position.

6. The gladhand assembly of claim 4, further comprising a sensor within the sealed portion, the sensor being configured to detect whether the actuator is in the extended position or in the retracted position, and wherein the controller is further configured to report through the wireless transceiver whether the sensor has detected that the actuator is in the extended position or in the retracted position.

7. The gladhand assembly of claim 1, further comprising:
a bracket within the housing, wherein the stop is rotatably attached to the bracket through a second axis, and wherein the actuator is further configured to rotate the stop about the second axis in a transition of the actuator between the retracted and extended positions.

8. The gladhand assembly of claim 7, wherein the actuator is also attached to the bracket and includes a piston attached to an underside of the stop.

9. The gladhand assembly of claim 8, wherein the stop includes a sloping upper surface.

10. The gladhand assembly of claim 4, wherein the wireless transceiver is a Bluetooth transceiver.

11. The gladhand assembly of claim 1, wherein the housing includes a cap contained within a window adjacent the stop to permit a user to engage the stop through the window to retract the stop from the lever.

12. A method of operating a gladhand assembly, comprising:
within a sealed portion of a housing, actuating a stop to be in an engaged position with a lever to maintain in a folded configuration a gladhand connected through a first axis to the lever; and
actuating the stop into a retracted position from the lever to permit the gladhand to be rotated about the first axis into a deployed configuration.

13. The method of claim 12, further comprising:
receiving a first command at a wireless transceiver, wherein actuating the stop into the engaged position is responsive to the first command; and
receiving a second command at the wireless transceiver, wherein actuating the stop into the retracted position is responsive to the second command.

14. The method of claim 13, further comprising:
detecting through a first sensor whether the lever is in the retracted position to detect whether the gladhand has been rotated about the first axis into the deployed configuration; and
reporting through the wireless transceiver a detection that the gladhand has been rotated about the first axis into the deployed configuration.

15. The method of claim 14, wherein the reporting through the wireless transceiver comprises sending a Bluetooth message.

16. The method of claim 12, wherein the actuating of the stop into the engaged position and into the retracted position comprises rotating the stop about a second axis.

17. A gladhand assembly; comprising:
a housing including a planar surface within a sealed portion of the housing;
a gladhand rotatably mounted to the housing through a first axis;
a lever attached to the first axis and configured to rotate with the gladhand about the first axis and across the planar surface within the sealed portion;
a stop contained within the sealed portion, the stop being configurable into an extended position in which the stop extends above the planar surface to engage with the lever and prevent the lever from rotating about the first axis, the stop being further configurable into a retracted position in which the stop is retracted below the planar surface to permit the gladhand to rotate about the first axis.

18. The gladhand assembly of claim 17, further comprising:
a wireless transceiver configured to receive a command to configure the stop into the retracted position;
a controller configured to configure the stop into the retracted position responsive to the command.

19. The gladhand assembly of claim 17, further comprising:
an actuator having a rod connected to the stop, the actuator being configurable between a retracted position in which the rod is withdrawn to configure the stop into the retracted position and configured into an extended position in which the rod is extended to configure the stop into the extended position.

20. The gladhand assembly of claim 17, wherein the gladhand assembly is attached to a towable asset.

* * * * *